(12) United States Patent
Hayashi et al.

(10) Patent No.: US 11,691,072 B2
(45) Date of Patent: Jul. 4, 2023

(54) AIMING DISPLAY AUTOMATION FOR HEAD MOUNTED DISPLAY APPLICATIONS

(71) Applicant: Sony Interactive Entertainment LLC, San Mateo, CA (US)

(72) Inventors: Eric M. Hayashi, Woodside, CA (US); Christopher Philip Nicholls, Thousand Oaks, CA (US); Heston Barber, Westlake Village, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/410,978

(22) Filed: Aug. 24, 2021

(65) Prior Publication Data

US 2023/0068862 A1  Mar. 2, 2023

(51) Int. Cl.
  *A63F 13/213*  (2014.01)
  *A63F 13/211*  (2014.01)
  *A63F 13/537*  (2014.01)
  *A63F 13/26*  (2014.01)

(52) U.S. Cl.
  CPC .......... *A63F 13/213* (2014.09); *A63F 13/211* (2014.09); *A63F 13/26* (2014.09); *A63F 13/537* (2014.09)

(58) Field of Classification Search
  CPC ...... A63F 13/213; A63F 13/211; A63F 13/26; A63F 13/537
  See application file for complete search history.

(56) References Cited

U.S. PATENT DOCUMENTS

| 11,278,810 | B1* | 3/2022 | Sarria, Jr. | A63F 13/57 |
| 2002/0184810 | A1* | 12/2002 | Day | F41C 27/00 42/79 |
| 2014/0362446 | A1* | 12/2014 | Bickerstaff | G02B 27/0093 359/630 |
| 2015/0133820 | A1* | 5/2015 | Zohar | G16H 20/30 600/595 |
| 2017/0092235 | A1* | 3/2017 | Osman | G06F 3/16 |
| 2017/0263058 | A1* | 9/2017 | Muta | A63F 13/525 |
| 2017/0354864 | A1* | 12/2017 | Rogers | A63F 13/213 |
| 2018/0096519 | A1* | 4/2018 | Tokubo | G06F 3/012 |
| 2018/0149444 | A1* | 5/2018 | Pell | G06F 3/011 |
| 2018/0321817 | A1* | 11/2018 | Terahata | A63F 13/5258 |
| 2018/0345128 | A1* | 12/2018 | Ahmed | A63F 13/537 |
| 2018/0348861 | A1* | 12/2018 | Uscinski | G06F 3/011 |
| 2019/0094981 | A1* | 3/2019 | Bradski | G06F 3/017 |

(Continued)

*Primary Examiner* — Seng H Lim
(74) *Attorney, Agent, or Firm* — Penilla IP, APC (57) ABSTRACT

A method for user interaction when gaming. The method including rendering a normal view of a virtual environment of a video game for display in an HMD of a user. The method including detecting a pose of a user holding a first controller and a second controller indicating that a virtual weapon is being held. The method including detecting that the pose of the user is raised to a firing position. The method including detecting that the pose of the user is in alignment with a face of the user. The method including detecting that a first eye of the user is closed. The method including detecting an object in the virtual environment being targeted by the pose that is in alignment with the face of the user. The method including rendering a magnified view of the object being targeted in the virtual environment for display in the HMD.

20 Claims, 7 Drawing Sheets

(56) References Cited

U.S. PATENT DOCUMENTS

| | | | | |
|---|---|---|---|---|
| 2019/0130622 A1* | 5/2019 | Hoover | ................ | G06V 40/193 |
| 2019/0354183 A1* | 11/2019 | Swindells | ............... | G06F 3/016 |
| 2020/0179807 A1* | 6/2020 | Yu | ........................... | A63F 13/67 |
| 2020/0360806 A1* | 11/2020 | Sun | ......................... | A63F 13/52 |
| 2021/0049360 A1* | 2/2021 | Yildiz | ................. | G02B 27/017 |
| 2022/0137701 A1* | 5/2022 | Bowman | ................ | G06F 3/165 |
| | | | | 345/156 |
| 2022/0241696 A1* | 8/2022 | Bagnariol | ............... | A63F 13/28 |

\* cited by examiner

AIMING DISPLAY AUTOMATION FOR HEAD MOUNTED DISPLAY APPLICATIONS

TECHNICAL FIELD

The present disclosure is related to computing gaming, and more specifically to recognizing user interaction with a gaming system to provide a totally immersive experience.

BACKGROUND OF THE DISCLOSURE

Video gaming provides gameplay within a virtualized gaming world. These video games may be formatted in single-player mode or multi-player mode. For example, video games may provide gaming from a first-person perspective or point-of-view, as if the player is viewing the virtual gaming environment from the eyes of a character in a three dimensional virtual space. A popular genre of gaming from a first-person perspective includes first-person shooter games that involve combat situations using much desired weaponry (e.g., large and effective guns with unlimited rounds) that follow a story line or course of action.

A goal of the video game developer is to provide to the player a fully immersive experience. That is, the player should feel that his or her gaming experience is close to reality when playing the video game. In other words, the player should have an experience that is similar to the experience of the character being controlled by the player. For example, physical movements of the player should be reflected in the player's view of the virtual gaming environment and character movement within the virtual environment in a manner that is expected.

However, it may be difficult to obtain a fully immersive experience of the player when playing a video game. That is, there may be a disconnect between the actions of a player and the virtual experience of the player. For example, translating physical motions of a player into a similar virtual motions of a character may be difficult to achieve when the player may not be handling a replica object but is expecting that the corresponding virtual object is handled appropriately in the virtual environment (e.g., the player is not physically handling a weapon but is hopefully translating physical motions into virtual handling and firing of a virtual weapon in the virtual environment).

It is in this context that embodiments of the disclosure arise.

SUMMARY

Embodiments of the present disclosure relate to computer gaming, and more specifically to providing a fully immersive experience for a player, such as when aiming a weapon within a virtual gaming environment as viewed through a head mounted display (HMD).

In one embodiment, a method for user interaction when gaming is disclosed. The method including rendering a normal view of a virtual environment of a video game for display in an HMD of a user. The method including detecting a pose of a user holding a first controller and a second controller indicating that a virtual weapon is being held. The method including detecting that the pose of the user is raised to a firing position. The method including detecting that the pose of the user is in alignment with a face of the user. The method including detecting that a first eye of the user is closed. The method including detecting an object in the virtual environment being targeted by the pose that is in alignment with the face of the user. The method including rendering a magnified view of the object being targeted in the virtual environment for display in the HMD.

In another embodiment, a non-transitory computer-readable medium storing a computer program for user interaction when gaming is disclosed. The computer-readable medium including program instructions for rendering a normal view of a virtual environment of a video game for display in an HMD of a user. The computer-readable medium including program instructions for detecting a pose of a user holding a first controller and a second controller indicating that a virtual weapon is being held. The computer-readable medium including program instructions for detecting that the pose of the user is raised to a firing position. The method including detecting that the pose of the user is in alignment with a face of the user. The computer-readable medium including program instructions for detecting that a first eye of the user is closed. The computer-readable medium including program instructions for detecting an object in the virtual environment being targeted by the pose that is in alignment with the face of the user. The computer-readable medium including program instructions for rendering a magnified view of the object being targeted in the virtual environment for display in the HMD.

In another embodiment, a computing system includes a processor and memory coupled to the processor and having stored therein instructions that, if executed by the computer system, cause the computer system to execute a method for user interaction when gaming. The method including rendering a normal view of a virtual environment of a video game for display in an HMD of a user. The method including detecting a pose of a user holding a first controller and a second controller indicating that a virtual weapon is being held. The method including detecting that the pose of the user is raised to a firing position. The method including detecting that the pose of the user is in alignment with a face of the user. The method including detecting that a first eye of the user is closed. The method including detecting an object in the virtual environment being targeted by the pose that is in alignment with the face of the user. The method including rendering a magnified view of the object being targeted in the virtual environment for display in the HMD.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Reference will now be made in detail to the various embodiments of the present disclosure, examples of which are illustrated in the accompanying drawings. Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe a method for providing a fully immersive experience for a player, such as when aiming a weapon within a virtual gaming environment as viewed through a head mounted display (HMD), and a computer-readable medium and computer system for implementing the same. In particular, the gaming system of a user is configured to recognize when the user playing a video game is handling a virtual weapon using one or more physical controllers of the gaming system, and when the user is engaging with a virtual scope associated with the virtual weapon to trigger a scope mode view that magnifies a object that is targeted within a virtual gaming environment. As such, embodiments of the present disclosure are able to translate physical movements of the user into corresponding and realistic movements of a character controlled by the user within the virtual gaming environment of the video game, along with generation of realistic views into the virtual gaming environment that are consistent with the physical movements of the user. In that manner, the user is able to achieve a fully immersive experience when playing the video game.

With the above general understanding of the various embodiments, example details of the embodiments will now be described with reference to the various drawings.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

It should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "rendering," "determining," "determining," "tracking," "performing," or the like, refer to actions and processes (e.g., flow diagram 200 of FIG. 2) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

The disclosure can also be embodied as computer readable code on a computer readable medium, such as program modules, executed by one or more computers or other devices. Further, communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
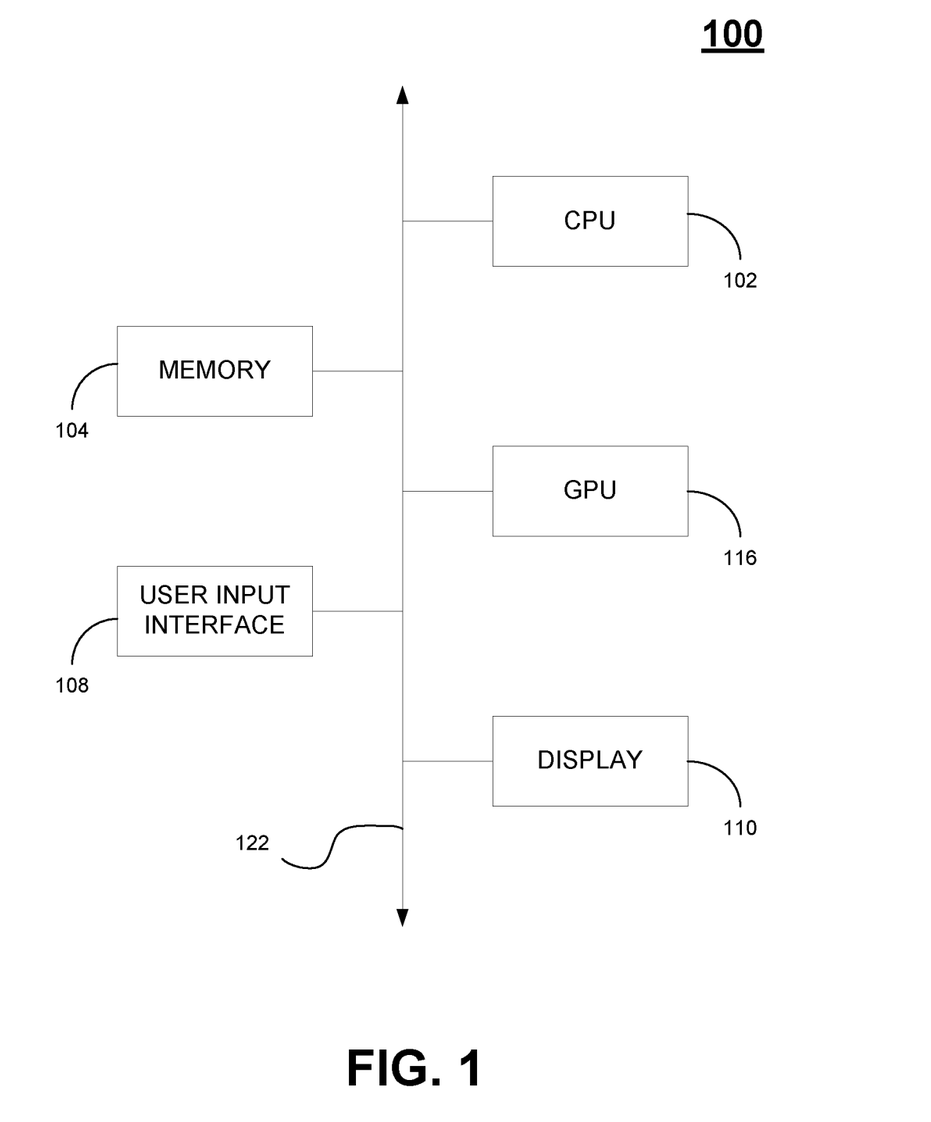
FIG. 1 illustrates components of an example device that can be used to perform aspects of the various embodiments of the present disclosure.

FIG. 1 illustrates components of an example device 100 that can be used to perform aspects of the various embodiments of the present disclosure. For example, FIG. 1 illustrates an exemplary hardware system suitable for executing a video game configured to recognize when the user playing a video game is handling a virtual weapon using one or more physical controllers of the gaming system, and when the user is engaging with a virtual scope associated with the virtual weapon to trigger a scope mode view that magnifies an object that is targeted within a virtual gaming environment, in accordance with one embodiment of the present disclosure. This block diagram illustrates a device 100 that broadly represents any single or multi-processor computing device or system capable of executing computer-readable instructions. Examples of device 100 can incorporate or can be, without limitation, a personal computer, workstations, a server computer, gaming console, client side terminals, laptops, mobile device, distributed computing systems, or other digital device, each of which is suitable for practicing an embodiment of the disclosure.

Both the central processing unit (CPU) 102 and the graphics processing unit (GPU) 116 are coupled to memory 104. Generally, CPU 102 and/or GPU 116 may represent any type or form of processor and/or computing device capable of processing data or interpreting and executing instructions. In certain embodiments, CPU 102 and/or GPU 116 may receive instructions from a software application or hardware module. These instructions may cause CPU 102 and/or GPU 116 to perform the functions of one or more of the example embodiments described and/or illustrated herein. CPU 102 and/or GPU 116 may also perform and/or be a means for performing any other steps, methods, or processes described and/or illustrated herein.

In particular, CPU 102 is configured for running software applications and optionally an operating system. CPU 102 may be comprised of one or more homogeneous or heterogeneous processing cores. In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

For example, CPU 102 provides the GPU 116 with data and/or instructions defining the desired output images, from which the GPU 116 generates the pixel data of one or more output images. The data and/or instructions defining the desired output images can be stored in memory 104 and/or dedicated graphics memory (not shown). In an embodiment, the GPU 116 includes 3D rendering capabilities for generating pixel data for output images from instructions and data defining the geometry, lighting, shading, texturing, motion, and/or camera parameters for a scene. The GPU 116 can further include one or more programmable execution units capable of executing shader programs.

Memory 104 stores applications and data for use by the CPU 102 and GPU 116. Memory 104 generally represents any type or form of volatile or non-volatile storage device or medium capable of storing data and/or other computer-readable instructions for applications, and may include, without limitation, fixed disk drives, removable disk drives, flash memory devices, RAM, ROM, and CD-ROM, DVD-ROM, Blu-ray, HD-DVD, or other optical storage devices, as well as signal transmission and storage media. In the example of FIG. 1, memory 104 is a shared memory, whereby the memory stores instructions and data for both the CPU 102 and the GPU 116. Alternatively, there may be separate memories dedicated to the CPU 102 and the GPU 116, respectively.

The GPU 116 periodically outputs pixel data for an image from a memory (e.g., graphics memory, frame buffer, etc.) to be displayed on display device 110. Display device 110 can be any device capable of displaying visual information in response to a signal from the device 100, including CRT, LCD, plasma, and OLED displays. Device 100 can provide the display device 110 with an analog or digital signal, for example. In one embodiment, display device 110 includes an HMD (e.g., displaying virtual reality or VR content).

User input devices 108 communicate user inputs from one or more users to device 100, examples of which may include keyboards, mice, joysticks, touch pads, touch screens, still or video recorders/cameras, and/or microphones. Also, a network interface (not shown) may provide for communications with other systems (e.g., communications between a game console, HMD, controllers, etc.) via an electronic communications network, and may include wired or wireless communication over local area networks and wide area networks such as the internet. The components of device 100, including CPU 102, GPU 116, memory 104, user input devices 108, network interface, etc. are connected via one or more data buses 122.

In some embodiments, a computer-readable medium containing a computer program may be loaded into computing system 100. All or a portion of the computer program stored on the computer-readable medium may then be stored in system memory 104 and/or various portions of storage devices. When executed by processors (e.g., CPU 102 and/or GPU 116), a computer program loaded into computing system 100 may cause CPU 102 and/or GPU 116 to perform and/or be a means for performing the functions of the example embodiments described and/or illustrated herein. Additionally or alternatively, the example embodiments described and/or illustrated herein may be implemented in firmware and/or hardware.

Figure 2:
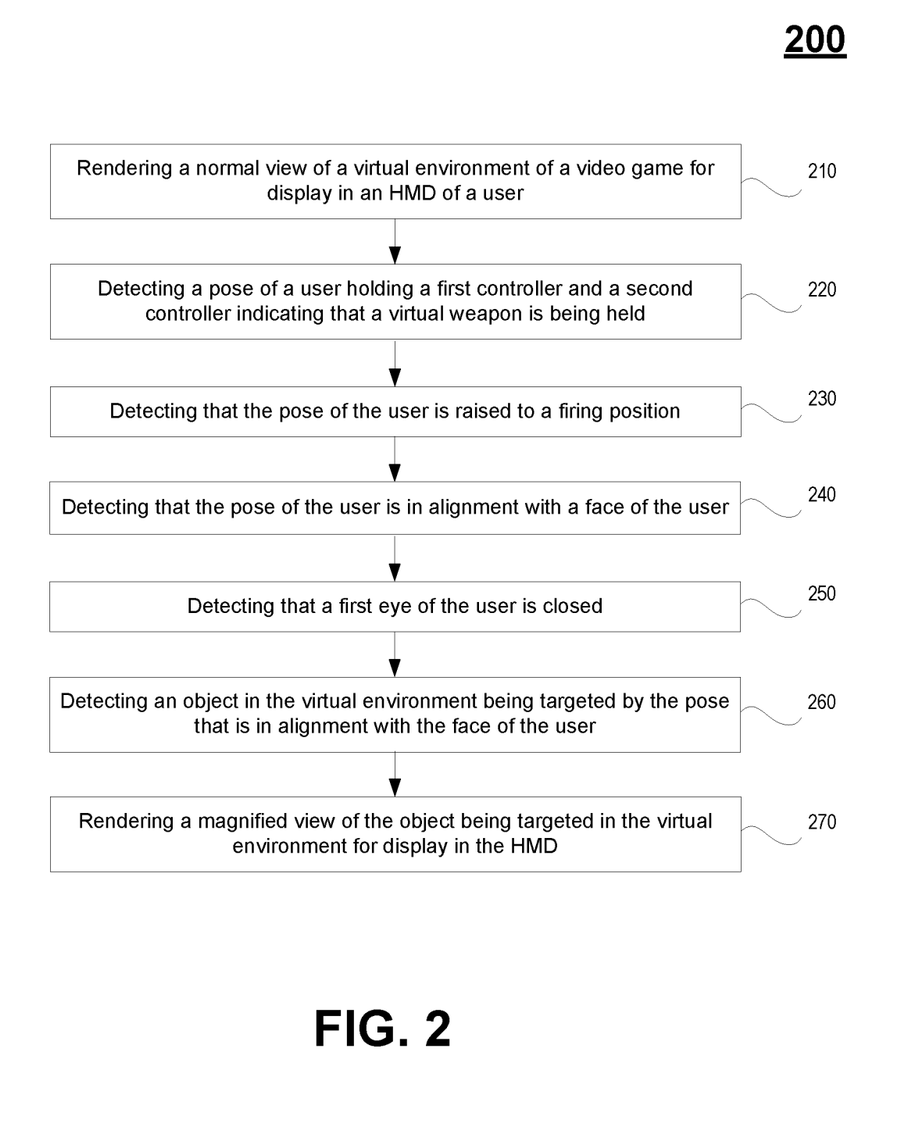
FIG. 2 is a flow diagram illustrating a method for user interaction when gaming, in accordance with one embodiment of the present disclosure.

FIG. 2 is a flow diagram 200 illustrating a method for user interaction when gaming, in accordance with one embodiment of the present disclosure. In particular, flow diagram 200 enables a fully immersive experience for a player or user when playing a video game, particularly when aiming a weapon within a virtual gaming environment of the video game as viewed through a head mounted display.

At 210, the method includes rendering a normal view of a virtual gaming environment of a video game for display in an HMD of a player. For example, video frames are generated for a three dimensional field-of-view (FOV) into the virtual gaming environment depending on the input controls and other control signals of the user. For instance, orientation of one or more parts of the player's body as well as movement of those parts may dictate which FOV into the virtual gaming environment is presented to the player with the corresponding generation of image frames.

As will be further described below, embodiments of the present disclosure provide for tracking movement of one or more parts of a player's body and/or one or more controllers (e.g., determining a gesture of the player) to trigger a viewing event, such as enabling a scope mode magnifying a particular object within the virtual gaming environment. In particular, the gaming system of a user is configured to recognize when the user playing a video game is handling a virtual weapon using one or more physical controllers of the gaming system, and when the user is engaging with a virtual scope associated with the virtual weapon to trigger a scope mode view that magnifies a object that is targeted within a virtual gaming environment. In other embodiments, the tracking of movement of one or more parts of the player's body and/or one or more controllers triggers other viewing events, such as peering through a peep-hole of a door, peering through a crack in a wall or shrubbery, etc. Still other embodiments provide for tracking of movement of one or more parts of the player's body to trigger any type of event implemented through the video game.

At 220, the method includes detecting a pose of a user holding a first controller and a second controller indicating that a virtual weapon is being held. In particular, a game play of a player playing the video game may include many types of activities, some of which involve handling a weapon (e.g., in a fire fight), and others that do not involve handling a weapon (e.g., moving from one point to another, talking to other characters, etc.). As such, it is important for the gaming system to recognize when the player wishes to use a weapon. For example, the gaming system may be configured to track one or more parts of the body of the player and/or one or more controllers for interfacing with the gaming system to determine a gesture or pose of the player that indicates that a virtual weapon is being handled by a character in the virtual gaming environment, wherein the character is controlled by the player.

In that manner, in the game play of the player, as the character moves through the virtual gaming environment, the character may be handling a weapon in anticipation of potential interactions with other characters and/or objects. For example, the pose of the player may indicate the handling of a virtual weapon, and/or may also indicate that the virtual weapon is held by the character in an at-the-ready position, which is a position adopted prior to aiming and/or firing. That is, additional movement is required by the player before the character can fire the weapon.

At 230, the method includes detecting that the pose of the player is raised to a firing position. In particular, the player may wish to have the character controlled by the player to use the virtual weapon. The gaming system may detect a change in the pose of the player that indicates that the character should be placed into a position enabling the firing of the weapon at a potential target. For example, the gaming system may detect that both arms are raised above the hips indicating that that character is in a position to fire the virtual weapon. In particular, the gaming system may determine that both arms and/or controllers are raised, and that one arm and/or controller is extended away from the body, while the other am and/or controller is proximate to the chest of player. Further, the aiming of the weapon may be targeted to a general area or area around a target at this point.

At 240, the method includes detecting that the pose of the player is in alignment with a face of the user. Now that the character controlled by the player is shown to be ready to fire a weapon in the virtual gaming environment, additional actions by the player may trigger a viewing event, such as providing a view through a scope integrated with the weapon. In particular, the pose of the player may be changed to show alignment with the face of the player. For example, the gaming system may detect that one arm and/or controller is placed at or near to the face of the player, and that other arm and/or controller is extended from the face of the player. In one embodiment, both arms and/or controllers are generally in alignment with the face of the player. That is, the arms and/or controllers are raised to be level horizontally with a face of the player, or at least within an acceptable offset from an eye level of the player (e.g., the offset defining a range of vertical distance above and below the eye level).

At 250, the method includes detecting that a first eye of the user is closed. Additional movement of the player may be required to trigger a viewing event, such as a scope mode view into the virtual gaming environment. For example, the gaming system may be configured to detect that at least one eye of the player has closed. This may indicate that the player is trying to engage with a virtual scope located on the virtual weapon, just as if the player were to physically engage with a real scope on a real weapon (e.g., rifle).

There may be additional movements of the player that are required to trigger the viewing event, such as the scope mode view into the virtual gaming environment. For example, the gaming system may be configured to detect a head tilt of the player, or a tilt of the HMD worn by the player. This head tilt may indicate that the player is trying to align an eye with the virtual scope, just as if the player were to tilt his or her head to physically engage with a real scope on a real weapon.

At 260, the method includes detecting an object in the virtual environment being targeted by the pose that is in alignment with the face of the user. In particular, that gaming system may be configured to determine an object that is being targeted by the player within the virtual gaming environment. For example, the object may be located nearest to a sight line drawn from the end of the weapon and into the virtual gaming environment. In another implementation, the object may be centered within the FOV of the virtual gaming environment being displayed within the HMD worn by the player, wherein the FOV is controlled by the player (e.g., orientation of the HMD or through eye tracking). In still other embodiments, the object may be determined through rules configured to determine the most relevant object within the scene that may be targeted. In still other embodiment, the object may be determined through artificial intelligence (AI) that takes into consideration the context of the game play, the scene shown in the FOV, and orientation of parts of the body of the player and/or one or more controllers used by the player.

At 270, the method includes rendering a magnified view of the object being targeted in the virtual environment for display in the HMD. In particular, the FOV provided to the player may be replaced with a scope mode view that includes a magnified view of the object. The scope mode view may automatically center the object as displayed in the HMD (e.g., centered on the virtual crosshair of the scope), or the player may have to adjust one or more body parts and/or controllers to center the object within the scope mode view. In that manner, any object that is centered within the crosshair of the scope has a high chance of being hit with a virtual projectile when the virtual weapon is fired by the character.

As such, embodiments of the present disclosure are able to translate physical movements of the player into corresponding and realistic movements of a character controlled by the player within the virtual gaming environment of the video game. Further, the physical movements of the player are used to trigger the generation of realistic views into the virtual gaming environment that are consistent with the physical movements of the user. For example, a detected pose and/or gesture of the player and/or movements of the player may trigger a scope mode view of the virtual gaming environment that includes an object that is being targeted, such as when the player is engaging with a virtual scope of a virtual weapon. In that manner, the user is able to achieve a fully immersive experience when playing the video game.

Figure 3:
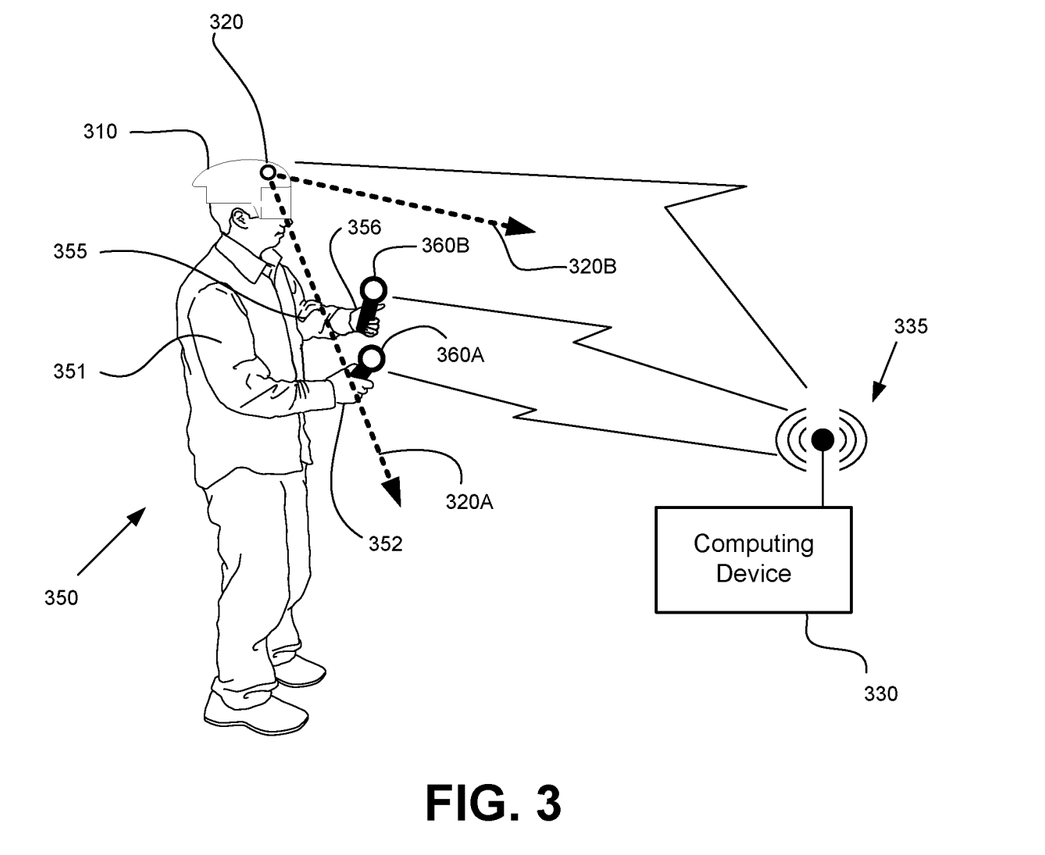
FIG. 3 illustrates a system for interactive gameplay of a video game, in accordance with an embodiment of the invention.

FIG. 3 illustrates a system 300 for interactive gameplay of a video game, in accordance with an embodiment of the invention. For example, the system 300 may be used for tracking movement associated with the user 350. A user 350 (e.g., player) is shown wearing an HMD 310. The HMD 310 is worn in a manner similar to glasses, goggles, or a helmet, and is configured to display an interactive video game and/or application or other content to the user 350. The HMD 310 may include an internal tracking system to help determine position and/or orientation of the HMD, such as the use of inertial sensors. The display system within the HMD 310 provides a very immersive experience to the user. As shown, the HMD 310 is in communication with the computing device 330.

In one embodiment, the HMD 310 can be connected to a computing device 330. The connection to computing device 330 can be wired or wireless, such as through the transmitter 335. The computing device 330 can be any general or special purpose computer known in the art, including but not limited to, a gaming console, thin client, personal computer, tablet computer, mobile device, etc.

In one embodiment, the computing device 330 can be configured to execute a video game and/or interactive application, and output the video and audio as virtual reality (VR) content from the video game for rendering by the HMD 310. In another embodiment, the computer facilitates streaming of video and audio from a cloud gaming server that is executing the video game and/or interactive application. In still another embodiment, the HMD is configured to execute the video game and/or interactive application, and/or facilitate streaming of video and audio from the cloud gaming server.

The user 350 may operate controllers 360A and 360B to provide input for the video game, such as through button presses, trigger activation, tracking to determine gestures, and other kinds of inputs suitable to operate the video game. In one embodiment, the controllers 360A and 360B may include inertial sensors used for tracking orientation and position of the controllers. As shown, controller 360A is held by the right hand 352, and controller 360B is held by the left hand 356 of the user 350. Each of controllers 360A and 360B may be in communication with the computing device 330 (e.g., through wired or wireless connections). Each of the controllers 360A and 360B may be configured to directly interact with computing device 330 (e.g., through direct communication), or through the tracking of orientation and movement of the controllers (i.e., to determine a pose and/or gesture, etc.).

Additionally, an inside-out camera and/or tracking system 320 integrated with the HMD 310 may be in communication with the computing device 330 (e.g., through wired or wireless connections). In particular, the inside-out camera and/or tracking system 320 can be configured to capture images or other data of the interactive environment (i.e., physical) in which the user 350 is located. The inside-out camera system and/or tracking system 320 is configured to look outwards from the HMD 310 for purposes of tracking objects. Captured images and/or data can be analyzed to determine the location and movements of the certain body parts of user 350, the HMD 310, and the controllers 360A and 360B. For example, the camera system and/or tracking 320 may be forward looking and used for tracking objects generally within an area defined by rays 320A and 320B (e.g., right arm 351 of the user, right hand 352, left arm 355, left hand 356, etc.). It is understood that the camera and/or tracking system 320 may be configured to track objects in any direction, such as 360 degrees in horizontal and/or vertical directions. In one embodiment, each of the controllers 360A and 360B may include a light or other marker element for tracking purposes which can be tracked to determine its location and orientation. In that manner, movements of the user may be tracked and translated to a pose indicating that a virtual weapon is being handled by a character within a virtual gaming environment, that the virtual weapon is being raised to a firing position, and/or that the character is engaging with a scope of the weapon to trigger a scope mode view of the virtual gaming environment.

In one embodiment, a gaze tracking system 325 is included in the HMD 310 to enable tracking of the gaze of the user. For example, the gaze tracking system 325 may capture images and/or other data for analysis to determine gaze direction of the user 350, which can be used to affect video rendering (e.g., used to determine the FOV shown on the display). It should be appreciated that the gaze direction of the user can be defined relative to the head mounted display, relative to a real environment in which the user is situated, and/or relative to a virtual environment that is being rendered on the head mounted display. In one embodiment, the gaze tracking system 325 is configured to determine the state of the eye, such as when the eye is open and/or closed.

Figure 4A:
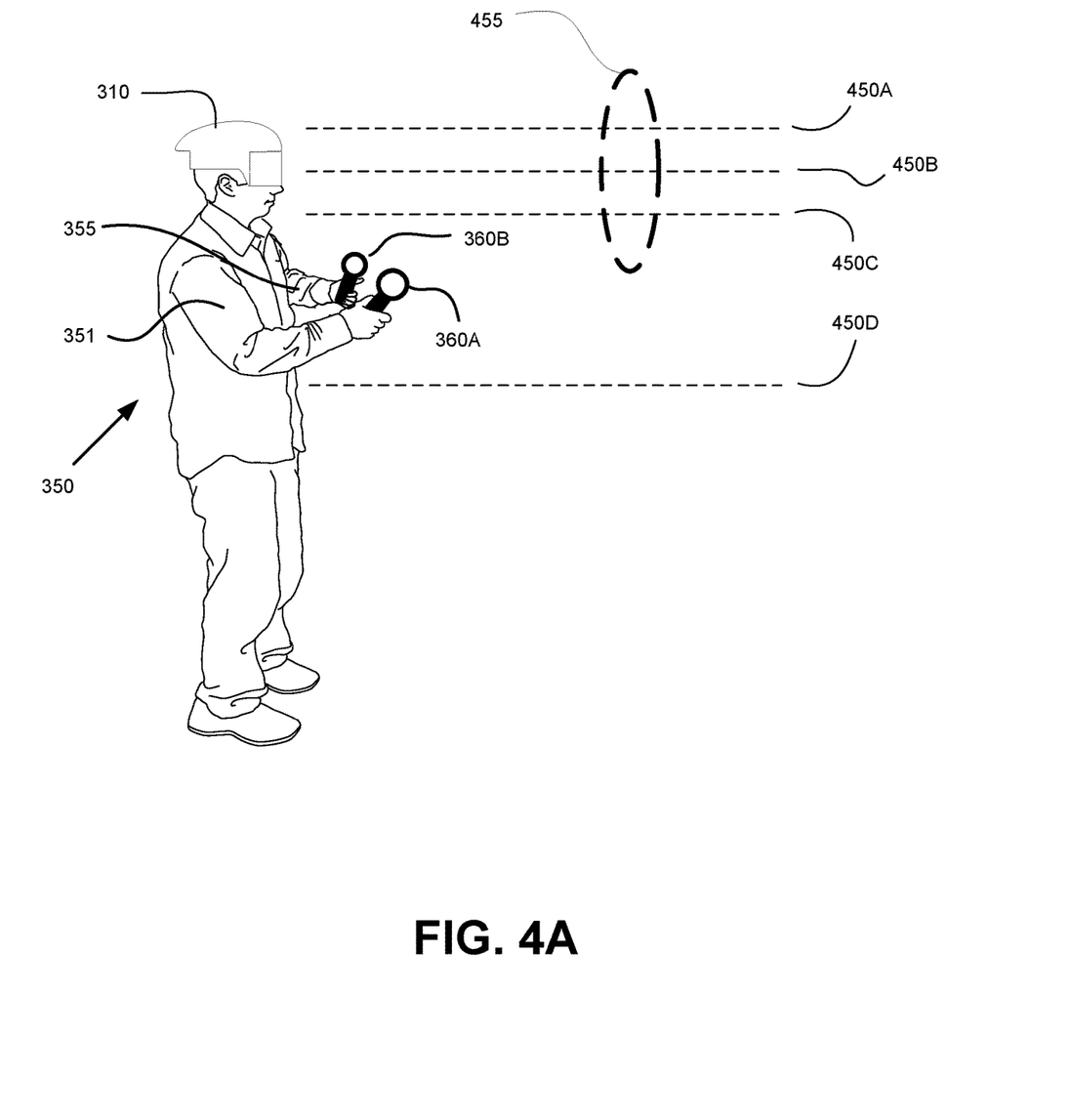
FIGS. 4A-4C illustrate a user interacting with a video game including movements by the user that translate into handling and aiming a weapon to trigger a scope mode view into the virtual gaming environment of the video game, in accordance with one embodiment of the present disclosure.
Figure 4B:
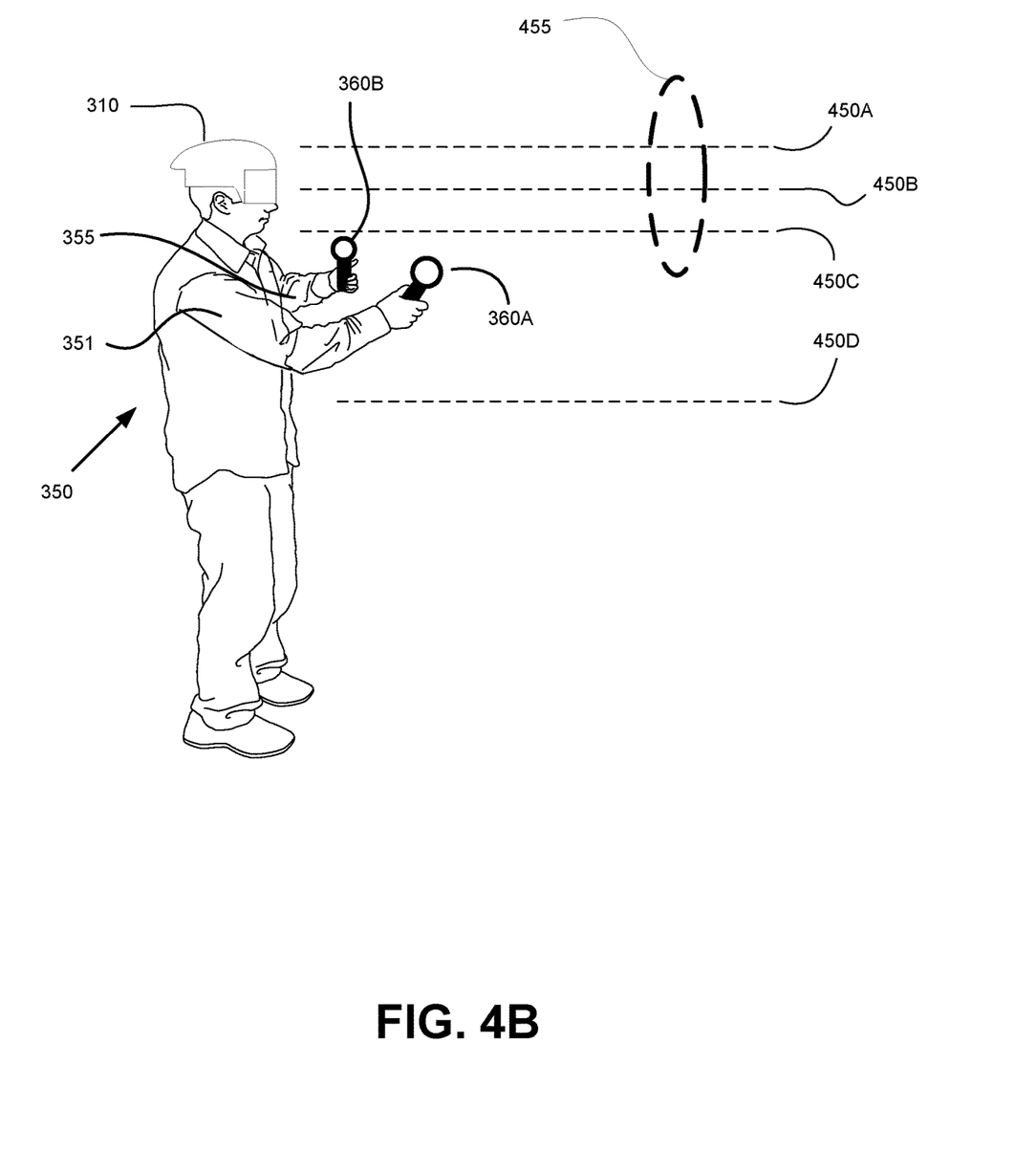
Figure 4C:
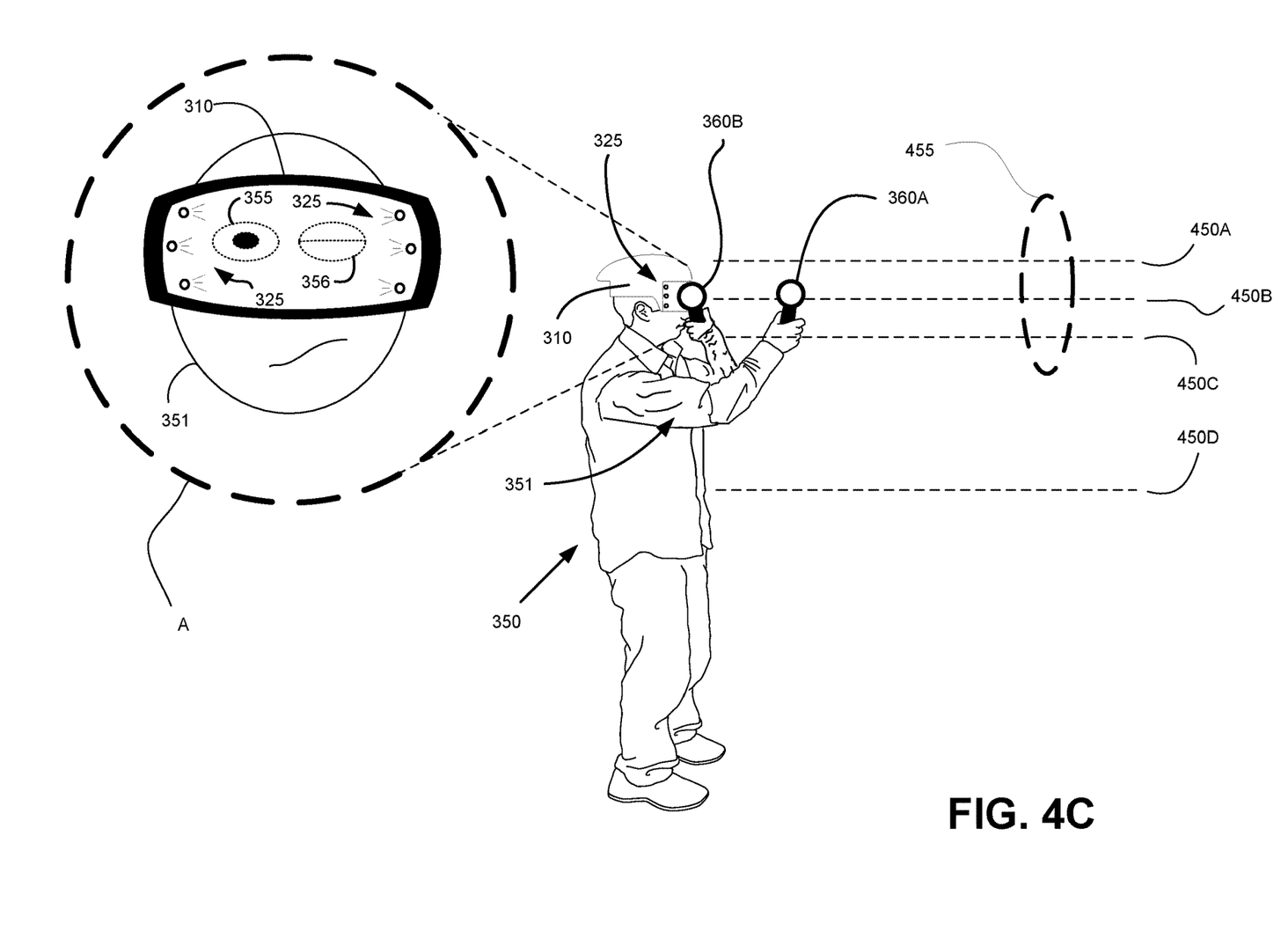

FIGS. 4A-4C illustrate a user interacting with a video game including movements by a player that translate into handling and aiming a weapon to trigger a scope mode view into the virtual gaming environment of the video game, in accordance with one embodiment of the present disclosure. Recognition of player interactions and/or gestures of a user or player is enabled through tracking movement and/or orientation of one or more parts of the player (e.g., eyes, head, arms, hands, etc.), and/or tracking movement and/or orientation of one or more controllers. For example, a gaming system may be configured to use an inside out camera and/or tracking system 320 of the HMD 310 to track movement and/or orientation of the HMD 310, right arm 351, left arm 355, controller 360A and controller 360B, as well as other parts of the player 350, and other objects. In addition, the gaming system may be configured to use a camera and/or tracking system within the HMD 310 to track movement and/or direction of each of the eyes of the player 350. It is appreciated that tracking movement of the player 350 and/or one or more body parts of the player, or HMD 310, or controllers 360A and 360B may be performed using any tracking system, such as a remote camera system that is capturing images and/or other data of the trackable object.

In particular, FIG. 4A illustrates a pose of a user or player 350 that is translated to handling a virtual weapon for use by a character within a virtual gaming environment of a video game, in accordance with one embodiment of the present disclosure. As shown, controller 360A is held using right arm 351 and right hand of the player 350, and controller 360B is held using the left arm 355 and left hand.

Various horizontal lines 450 are projected from player 350, each representing a level that can be referenced to the player 350. For example, line 450D extends from approximately the waist of player 350. That is, line 450D approximately defines and/or be referenced to a waist height of player 350. Also, lines 450A, 450B, and 450C in combination define a range of heights that can be referenced to the eyes of the player 350. More particularly, lines 450A-C may define and/or be referenced to an eye level of the player 350. That is, line 450B defines the actual eye level of player 350, line 450A defines an upper boundary of the eye level of player 350, and line 450C defines a lower boundary of the eye level of player 350. In that manner, an object falling within the upper and lower boundaries of the eye level of player 350 (i.e., the object is tracked to be located at a height between the line 450A and line 450C made with reference to player 350) can be defined to be aligned with one or more eyes of the player 350.

As shown, the gaming system detects that controllers 360A and 360B are held in a pose or gesture to indicate that a character controlled by the player should be handling a virtual weapon in the virtual gaming environment. In particular, the pose may be any pose that is different than a relaxed pose, wherein the relaxed pose may have one or both arms 351 and 355 laying at the side of the player 350, or wherein the relaxed pose may have one or both controllers 360A and 360B at the side of player 350. For example, the pose may have both arms 351 and 355 and/or both controllers 360A and 360B above the waist of player 350. As shown, the arms 351 and 355 and/or both controllers 360A and 360B are above line 450D indicating the waist level of player 350. When this pose is detected, the gaming system recognizes that the character controlled by the player is now handling a virtual weapon.

It is understood that the pose can be any type of pose and/or gesture that indicates the intention of the player for a character to handle a weapon within the virtual gaming environment. In one embodiment, the pose can be calibrated through user selection, such as setting the pose to a particular configuration of the body.

In one embodiment, the pose may indicate that the character should be in an at-the-ready position. That is, the character should be in a position that is ready to be aimed and fired. For example, the gaming system may be configured to detect that the player is holding a first controller with one hand and holding a second controller with a second hand (e.g., right and left hands). Further, the gaming system is configured to detect that the first controller is in close proximity to a body (e.g., chest) of the player. Also, the gaming system is configured to detect that the second controller is extended from the body of the user. That is, the controllers and/or arms are positioned in physical space such that they are not hanging downwards at the side of the user indicating a relaxed pose (i.e., not handling a weapon).

FIG. 4B illustrates the user or player 350 of FIG. 4A making a gesture that raises the virtual weapon to a firing position for use within a virtual gaming environment of the video game, in accordance with one embodiment of the present disclosure. After the pose of the player 350 is detected in FIG. 4A, which indicates that the character is handling the virtual weapon, the player may make further movements and/or gestures to indicate that the virtual weapon should be in a firing position. That is, the character should be handling the virtual weapon in a manner to allow for immediate firing.

As shown, the gaming system detects that controllers 360A and 360B are raised to a higher position than when just handling the weapon, such as the pose shown in FIG. 4A. For example, controllers 360A and 360B are each raised higher in relation to the HMD 310 worn by player 350, such as being closer to the lower boundary of eye level, as indicated by line 450C. Furthermore, the gaming system may detect that one controller (e.g., controller 360A) is held extended out from the body of player 350, and that the other controller (e.g., controller 360B) is held closer or proximate to the body of player 350. That is, the controllers are held in a position in relation to the body of player 350 to simulate the handling of a physical weapon in a firing position (i.e., arms raised, one arm extended to hold the barrel of the weapon, and one arm cradled around the butt of the weapon with the hand on the trigger), which can then be translated to a character holding the virtual weapon in a firing position in the virtual gaming environment.

FIG. 4C illustrates the user or player 350 of FIGS. 4A-4B bringing the controllers 360A and 360B into alignment with an eye of the player, and detecting that the player is making a gesture indicating an engagement with a virtual scope of a virtual weapon in order to trigger a scope mode view into the virtual gaming environment of the video game, in accordance with one embodiment of the present disclosure. That is, the player 350 makes additional movements and/or gestures that can be translated to having the character interact with the virtual scope of the virtual weapon. That is, the character is engaging with the scope, and as such, the player should be given a view through the virtual scope of the virtual weapon in the display of the HMD.

The position and orientation of player 350 shown in FIG. 4C remains in the firing position, but is adjusted to indicate interaction with a virtual scope of the virtual weapon to enable increased targeting ability. That is, the gaming system detects that that one controller (e.g., controller 360A) is held extended out from the face of player 350 at the level of the eye, and that the other controller (e.g., controller 360B) is held closer or proximate to the face of player 350, or HMD 310 worn by player 350. More particularly, the gaming system detects that controllers 360A and 360B are each raised to position that is approximately level with at least one eye of the player 350 (e.g., a second eye), such as the eye used for viewing through a scope. For example, controllers 360A and 360B are each raised to a level in relation to the player 350, and more particularly to the HMD 310, that is high enough to be in alignment with an eye of the user.

For purposes of illustration, to be in complete alignment with an eye of the player 350, each of the controllers 360A and 360B would be located along line 450B, which is at the eye level of the player 350. However, in one implementation, the level and/or height of each of the controllers 360A and 360B need not be in perfect alignment with the eye of the player (i.e., all located along line 450B), and instead may fall within a range defining an offset from perfect alignment indicated by line 450B. For example, the controllers 360A and 360B may each be located between lines 450A and 450C that define an acceptable range for levels of controller 360A and 360B to be in alignment with an eye of the player 350 intended for use with the scope. In that manner, after the controllers are raised to indicate that the character is handling the virtual weapon in a firing position, when the controllers 360A and 360B are brought into alignment with the eye of the player, this indicates that the player wishes to use the virtual scope of the virtual weapon.

Furthermore, an additional action by the player 350 may be required to trigger a viewing event, such as enabling a scope mode view in the HMD. For example, the gaming system may detect that an eye of the player is closed. As previously described, an internal camera and/or tracking system 325 may be configured to track eye movement. FIG. 4C shows a blow up of the face of player 350 wearing an HMD 310 in window A. The eye 356 that is detected to be closed 356 (e.g., the first eye) may be opposite to the eye 355 that is intended for viewing through the scope (e.g., the second eye). That is, the eye 356 that is detected to be closed by the camera tracking system 325 is opposite the second eye 355 that is open.

In another embodiment, the additional action may be any action of the player indicating intended interaction with the virtual scope of the virtual weapon. For example, the gaming system may detect a tilt of the head or face of player 350, which indicates that player 350 wishes to use the virtual scope of the virtual weapon. The tilting may be detected through tracking of movement of the HMD 310, such as through inertial systems, or camera systems, etc. One or more additional actions may be required to trigger the viewing event. For example, any additional action may be used to trigger the viewing event, such as closing an eye, head tilt, etc. Also, multiple actions may be required to trigger the viewing event, such as requiring both the closing of an eye and a head tilt.

Figure 5A:
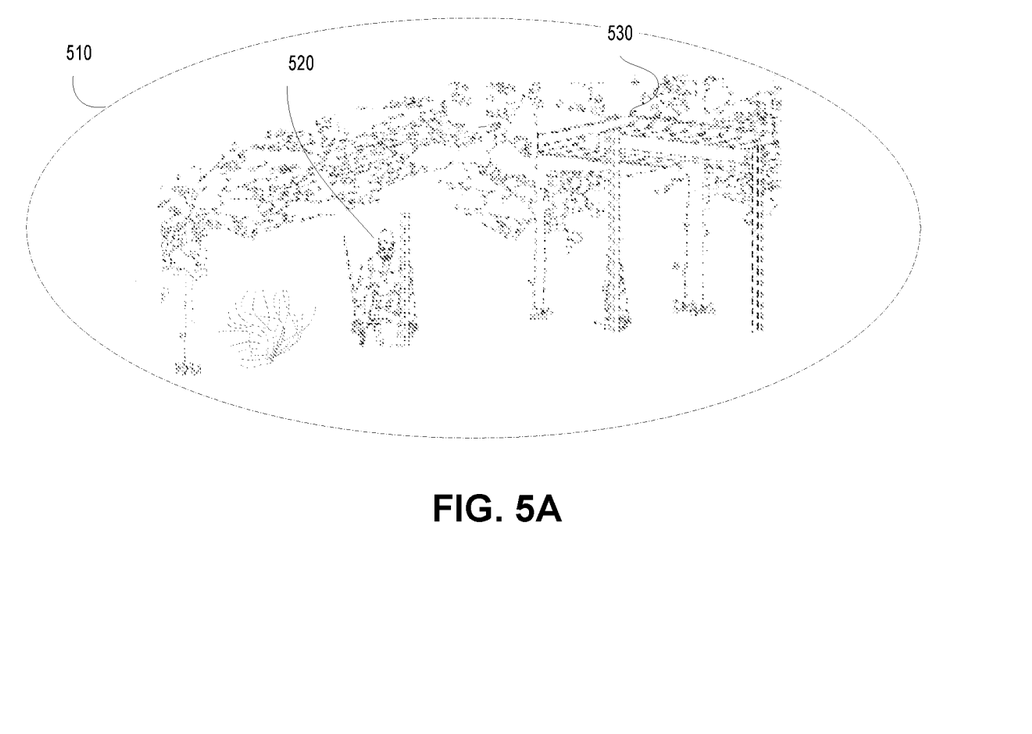
FIG. 5A illustrates a normal view into the virtual gaming environment of a video game, in accordance with one embodiment of the present disclosure.
Figure 5B:
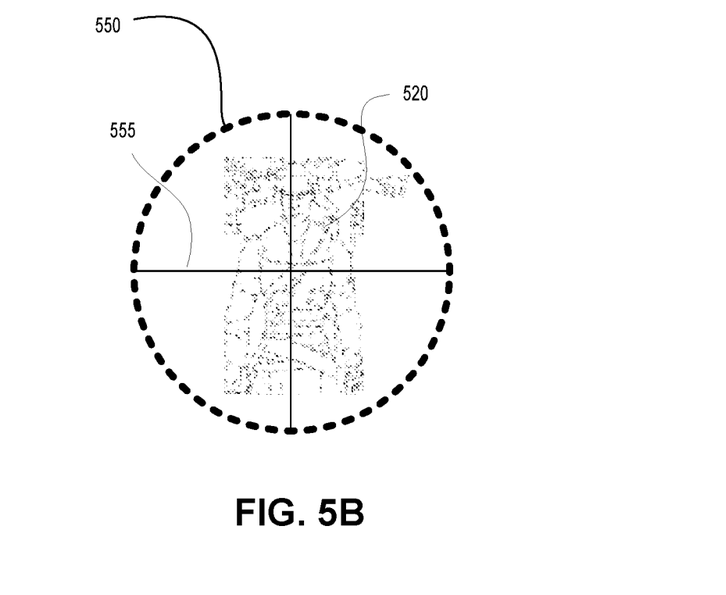
FIG. 5B illustrates a scope mode view providing a magnified view of a target object within a virtual gaming environment of a video game, in accordance with one embodiment of the present disclosure.

Once the additional one more actions are detected (e.g., closing of an eye, head tilt, etc.), a scope mode view showing a magnified view of an object being targeted is shown in the display of the HMD 310. In one embodiment, the view displayed in the HMD 310 may snap to the scope mode view. That is, the HMD abruptly switches from a normal view of the virtual gaming environment to the scope mode view. In particular, FIG. 5A illustrates a normal view into the virtual gaming environment of a video game, in accordance with one embodiment of the present disclosure. As shown, a FOV 510 includes a jungle scene of a soldier 520 located near an open fire, and a shelter 530 (e.g., awning). FIG. 5B illustrates a scope mode view 550 that is displayed in the HMD 310 after the actions by the player 350 triggers the viewing event (i.e., the scope mode view). In particular, the scope mode view 550 provides a magnified view of an object that is being targeted (e.g., the soldier 520) within the virtual gaming environment of a video game, in accordance with one embodiment of the present disclosure. In one implementation, the scope mode view fills the entirety or a major portion of the display of the HMD.

As previously described, the object being targeted may be selected as being closest to a sight line extending from the barrel end of the weapon, or by being centered within the FOV of the normal view, or determined to be an object that is highly likely to be targeted within the scene when in the normal view, or may be determined through artificial intelligence, or by rules, or by user selection, or through any suitable means for determining a targeted object.

Also, the object being targeted (i.e., soldier 520) may be centered on a crosshair 555 of the scope mode view when presented to the player in the display of the HMD 310. In other embodiments, the object being targeted may not be centered and requires additional actions by the player to align the object with the crosshair 555.

In one embodiment, the gaming system may be configured to detect a movement of the player that indicates a desire to target a second object in the virtual gaming environment. That is, the magnified view through the virtual scope of the virtual gaming environment is maintained within the display of the HMD 310 as the player moves the scope mode view through the virtual gaming environment, until setting on the second object. As a result, the gaming system is configured to render a magnified view of the second object being targeted in the virtual environment for display in the HMD in the scope mode view.

In another embodiment, the gaming system is configured to terminate the scope mode view (e.g., shown in FIG. 5B) and return back to the normal view of the virtual gaming environment (e.g., shown in FIG. 5A) after detecting another trigger action by the player 350. For example, the gaming system may detect when the first eye reopens, wherein the first eye was closed to trigger the viewing event (i.e., the scope mode view). Also, before terminating the scope mode view, the gaming system may detect that the eye is reopened and remains open for a period of time. In still another embodiment, the gaming system may detect any action used for terminating the scope mode view. For example, the gaming system may detect that one or more controllers 360A and 360B are dropped from an eye level of the player (i.e., drops below line 450C), or may detect that one or more controllers are resting at the side of the player. Thereafter, the scope mode view is terminated, and the gaming system renders the normal view of the virtual environment. In one embodiment, the gaming system may transition back to displaying the normal view in the HMD, such as fading out from the scope mode view, and fading back into the normal view. In still another embodiment, there may be a time decay implemented before terminating the scope mode view. That is, even though the gesture of the player indicates a desire to terminate the scope mode view, there is a time decay before transitioning from the scope mode view to the normal view of the virtual gaming environment. For example, one or both arms may be relaxed to rest at the sides of the player, and correspondingly one or both controllers may be detected to be at or near or below the waist of the player, which may define a gesture indicating a desire to terminate the scope mode view. However, the time decay provides for the scope mode view to remain in view in the HMD for a brief period of time in case the player has mistakenly performed the gesture (e.g., player is tired and is resting arms). In one implementation, the time decay is sufficient to allow for the player to regain the gesture and/or body position to trigger the scope mode view, so that there is no pause in the scope mode view presented to the player in the HMD.

In still another embodiment, different types of gestures by the player triggers different viewing events. For example, in one embodiment, the gaming system may be configured to detect a gesture that can be translated into a character holding a virtual magnifying glass in a virtual gaming environment, such as holding one controller above the waist of the player, or detecting that the controller is held at eye level of the player, or any other suitable action configured to convey the handling of the magnifying glass. Further action by the player may indicate a viewing event to include a magnified view of an object. For instance, additional actions, alone or in combination, may be performed to trigger the viewing event, to include detecting that the controller is moved to eye level, detecting that the controller is placed proximate to the face, and detecting that an eye of the player is closed (e.g., the eye opposite to the one being used for viewing through the magnifying glass). In that manner, a magnified view of an object being targeted may be presented to the player in the HMD.

In another embodiment, the gaming system may be configured to detect a gesture that can be translated into a character peering through a peep hole in a virtual gaming environment, such as one located in a wall, or door, in the floor, in the ground, in some surface, etc. The gesture may include one or more actions by the player to trigger the viewing event, to include tilting of the face or head of the player, and/or detecting that the head of the player is pushed forward away from the body of the player as if to get a better view through the peep hole, closing an opposite eye (e.g., the eye opposite the one being used for viewing through the peep hole). These actions may be performed by the player as a character is interacting with the virtual peep hole. In that manner, the viewing event may include generating a magnified view of an area of the virtual gaming environment that is shown through the virtual peep hole, and presenting the magnified view in the HMD to the player.

In still another embodiment, the gaming system may be configured to detect a gesture that can be translated into a character peering through a crack in a surface in a virtual gaming environment, such as a crack located in a wall, in the floor, in the ground, through shrubbery, etc. The gesture may include one or more actions by the player to trigger the viewing event, to include tilting of the face or head of the player, and/or detecting that the head of the player is pushed forward away from the body of the player as if to get a better view through the crack, etc. These actions may be performed by the player as a character is interacting with the virtual crack in the virtual gaming environment. In that manner, the viewing event may include generating a focused view into an area of the virtual gaming environment that is accessible through the virtual crack. The focused view may be magnified, or modified to provide an enhanced, or distorted view of the area through the virtual crack.

Accordingly, the present disclosure describes methods and systems for user interaction with gaming systems for purposes of automating the aiming of virtual weapons for head mounted display applications. In that manner, a user is provided with a fully immersive experience, such as when aiming a weapon within a virtual gaming environment as viewed through an HMD. In particular, the gaming system of a user is configured to recognize when the user playing a video game is handling a virtual weapon using one or more physical controllers of the gaming system, and when the user is engaging with a virtual scope associated with the virtual weapon to trigger a scope mode view that magnifies an object that is targeted within a virtual gaming environment.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium, such as program modules, executed by one or more computers or other devices. The computer readable medium is any data storage device that can store data, which can be thereafter be read by a computer system. By way of example, and not limitation, computer-readable storage media may comprise non-transitory computer storage media and communication media. Examples of the computer readable medium include, but are not limited to, hard drives, network attached storage (NAS), read-only memory, random-access memory, electrically erasable programmable ROM (EEPROM), flash memory or other memory technology, compact disk ROM (CD-ROM), CD-Rs, CD-RWs, magnetic tapes and other optical and non-optical data storage devices, or any other medium that can be used to store information that is accessible. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for user interaction when gaming, comprising:
    rendering a normal view of a virtual environment of a video game for display in an HMD of a user;
    detecting a pose of the user holding a first controller and a second controller indicating that a virtual weapon is being held in a ready position, wherein the first controller is higher in a vertical direction than the second controller;
    detecting that the pose of the user indicates that the virtual weapon is raised to a firing position, wherein the first controller and the second controller are within a minimum vertical distance from each other;
    detecting that the pose of the user indicates that the virtual weapon is in alignment with a face of the user;
    detecting that a first eye of the user is closed;
    detecting an object in the virtual environment being targeted by the pose that is in alignment with the face of the user;
    automatically changing from the normal view of the virtual environment to a scope view for display in the HMD based on the detecting of the object, wherein the scope view includes the object and focuses on a limited area around the object; and
    rendering a magnified view of the object being targeted in the virtual environment for display in the scope view in the HMD.

2. The method of claim 1, wherein the detecting the pose includes:
    detecting that the user is holding the first controller with a first hand and holding the second controller with a second hand,
    detecting that the first controller is in close proximity to a body of the user; and
    detecting that the second controller is extended from the body of the user.

3. The method of claim 1, further comprising:
    tracking movement of a first arm and a second arm of the user; and
    tracking movement of the first controller and the second controller.

4. The method of claim 3, wherein the detecting that the pose of the user indicates that the virtual weapon is raised to the firing position includes:
  detecting when the first arm and the second arm are raised upwards in relation to the HMD.

5. The method of claim 3, wherein the detecting that the pose of the user indicates that the virtual weapon is in alignment with the face of the user includes:
  detecting that the first controller is close in proximity to the face of the user; and
  detecting that the second controller is extended from the face of the user and at a level of the face.

6. The method of claim 5, wherein the detecting that the first eye of the user is closed includes:
  detecting that the first controller and the second controller are in alignment with a second eye of the user,
  wherein the first eye that is detected to be closed is opposite the second eye.

7. The method of claim 3, further comprising:
  performing inside-out tracking of the first arm of the user, the second arm of the user, the first controller, and the second controller using a camera system of the HMD.

8. The method of claim 1, wherein the detecting that the first eye of the user is closed includes:
  tracking the first eye and a second eye of the user with a camera system in the HMD.

9. The method of claim 1, further comprising:
  detecting a tilt of the face of the user.

10. The method of claim 1, further comprising:
  displaying the normal view of the virtual environment; and
  abruptly displaying the magnified view of the object being targeted in the virtual environment upon detecting that the first eye of the user is closed.

11. The method of claim 10, further comprising:
  detecting when the first eye reopens and remains open for a period of time;
  rendering the normal view of the virtual environment; and
  transitioning to displaying the normal view in the HMD.

12. The method of claim 11, further comprising:
  detecting that the user is no longer in the pose.

13. The method of claim 1, further comprising:
  detecting a movement of the pose of the user is targeting a second object; and
  rendering a magnified view of the second object being targeted in the virtual environment for display in the HMD.

14. A non-transitory computer-readable medium storing a computer program for user interaction when gaming, the computer-readable medium comprising:
  program instructions for rendering a normal view of a virtual environment of a video game for display in an HMD of a user;
  program instructions for detecting a pose of the user holding a first controller and a second controller indicating that a virtual weapon is being held in a ready position, wherein the first controller is higher in a vertical direction than the second controller;
  program instructions for detecting that the pose of the user indicates that the virtual weapon is raised to a firing position, wherein the first controller and the second controller are within a minimum vertical distance from each other;
  program instructions for detecting that the pose of the user indicates that the virtual weapon is in alignment with a face of the user;
  program instructions for program instructions for detecting that a first eye of the user is closed;
  program instructions for detecting an object in the virtual environment being targeted by the pose that is in alignment with the face of the user;
  program instructions for automatically changing from the normal view of the virtual environment to a scope view for display in the HMD based on the detecting of the object, wherein the scope view includes the object and focuses on a limited area around the object; and
  program instructions for rendering a magnified view of the object being targeted in the virtual environment for display in the scope view in the HMD.

15. The computer-readable medium of claim 14, further comprising:
  program instructions for tracking movement of a first arm and a second arm of the user; and
  program instructions for tracking movement of the first controller and the second controller.

16. The computer-readable medium of claim 15, wherein the program instructions for the detecting that the pose of the user indicates that the virtual weapon is raised to the firing position includes:
  program instructions for detecting when the first arm and the second arm are raised upwards in relation to the HMD.

17. The computer-readable medium of claim 15,
  wherein the program instructions for detecting that the pose of the user indicates that the virtual weapon is in alignment with the face of the user includes:
    program instructions for detecting that the first controller is close in proximity to the face of the user; and
    program instructions for detecting that the second controller is extended from the face of the user and at a level of the face,
  wherein the program instructions for detecting that the first eye of the user is closed includes:
    program instructions for detecting that the first controller and the second controller are in alignment with a second eye of the user, wherein the first eye that is detected to be closed is opposite the second eye.

18. A computer system, comprising:
  a processor;
  memory coupled to the processor and having stored therein instructions that, if executed by the computer system, cause the computer system to execute a method for user interaction when gaming, comprising:
    rendering a normal view of a virtual environment of a video game for display in an HMD of a user;
    detecting a pose of the user holding a first controller and a second controller indicating that a virtual weapon is being held in a ready position, wherein the first controller is higher in a vertical direction than the second controller;
    detecting that the pose of the user indicates that the virtual weapon is raised to a firing position, wherein the first controller and the second controller are within a minimum vertical distance from each other;
    detecting that the pose of the user indicates that the virtual weapon is in alignment with a face of the user;
    detecting that a first eye of the user is closed;
    detecting an object in the virtual environment being targeted by the pose that is in alignment with the face of the user;
    automatically changing from the normal view of the virtual environment to a scope view for display in the HMD based on the detecting of the object, wherein the scope view includes the object and focuses on a limited area around the object; and rendering a magnified view of the object being targeted in the virtual environment for display in the scope view in the HMD.

19. The computer system of claim 18, wherein the method includes:

tracking movement of a first arm and a second arm of the user; and tracking movement of the first controller and the second controller.

20. The computer system of claim 18, wherein in the method the detecting that the pose of the user indicates that the virtual weapon is raised to the firing position includes:

detecting when the first arm and the second arm are raised upwards in relation to the HMD, wherein in the method the detecting that the pose of the user indicates that the virtual weapon is in alignment with the face of the user includes:

detecting that the first controller is close in proximity to the face of the user; and detecting that the second controller is extended from the face of the user and at a level of the face, wherein in the method the detecting that the first eye of the user is closed includes:

detecting that the first controller and the second controller are in alignment with a second eye of the user, wherein the first eye that is detected to be closed is opposite the second eye.

\* \* \* \* \*